United States Patent
Abou Mahmoud et al.

(10) Patent No.: US 10,129,193 B2
(45) Date of Patent: Nov. 13, 2018

(54) IDENTIFYING RELEVANT CONTENT CONTAINED IN MESSAGE STREAMS THAT APPEAR TO BE IRRELEVANT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 14/943,396

(22) Filed: Nov. 17, 2015

(65) Prior Publication Data
US 2017/0142046 A1     May 18, 2017

(51) Int. Cl.
*H04L 12/58* (2006.01)
*G06F 17/27* (2006.01)
(Continued)

(52) U.S. Cl.
CPC ............ *H04L 51/12* (2013.01); *G06F 17/279* (2013.01); *G06F 17/2785* (2013.01);
(Continued)

(58) Field of Classification Search
CPC .... G06F 17/2785; G06F 17/279; G06F 17/28; G06F 17/30247; G06F 17/30702;
(Continued)

(56) References Cited

U.S. PATENT DOCUMENTS

| 4,384,329 A | 5/1983 | Rosenbaum et al. |
| 5,305,208 A | 4/1994 | Doi et al. |

(Continued)

FOREIGN PATENT DOCUMENTS

WO     2009090498 A2     7/2009

OTHER PUBLICATIONS

Dyer, P., "Understanding Facebook EdgeRank," [online] SocialMediaToday.com © 2015, May 6, 2013, [retrieved Nov. 17, 2015] retrieved from the Internet: <http://www.socialmediatoday.com/content/understanding-facebook-edgerank-infographic>, 14 pg.

(Continued)

*Primary Examiner* — Gil H. Lee
(74) *Attorney, Agent, or Firm* — Cuenot, Forsythe & Kim, LLC

(57) ABSTRACT

A first level of relevance, to at least one interest of a user, of content within a topic message within a message stream can be determined. Responsive to determining that the first level of relevance, to the at least one interest of the user, of the content within the topic message is below a threshold value, each of a plurality of other messages within the message stream can be processed using natural language processing performed by a processor. A respective second level of relevance, to the at least one interest of the user, of each the other messages can be determined. For each of the other messages for which the respective second level of relevance is equal to or above the threshold value, an alert can be presented to bring an attention of the user to the other message.

18 Claims, 3 Drawing Sheets

(51) Int. Cl.
　　　*G10L 15/26*　　　(2006.01)
　　　*G06F 17/30*　　　(2006.01)
　　　*G06F 17/28*　　　(2006.01)
　　　*G06Q 10/10*　　　(2012.01)

(52) U.S. Cl.
　　　CPC ........ *G06F 17/28* (2013.01); *G06F 17/30702* (2013.01); *G06Q 10/103* (2013.01); *G10L 15/265* (2013.01); *H04L 51/24* (2013.01); *H04L 51/32* (2013.01); *G10L 15/26* (2013.01)

(58) Field of Classification Search
　　　CPC ....... G10L 15/265; H04L 51/12; H04L 51/24; H04L 51/32
　　　See application file for complete search history.

(56) References Cited

U.S. PATENT DOCUMENTS

| | | | |
|---|---|---|---|
| 6,088,692 | A | 7/2000 | Driscoll |
| 6,546,390 | B1 | 4/2003 | Pollack et al. |
| 8,577,915 | B2 | 11/2013 | Barve et al. |
| 8,756,239 | B2 | 6/2014 | Wable et al. |
| 8,775,429 | B2 | 7/2014 | Choudhary et al. |
| 8,918,468 | B1 | 12/2014 | Fisher et al. |
| 9,026,479 | B1 | 5/2015 | Baluja et al. |
| 9,117,227 | B1 * | 8/2015 | Agrawal ............ G06Q 30/0242 |
| 2003/0139902 | A1 | 7/2003 | Geib et al. |
| 2010/0121849 | A1 | 5/2010 | Goeldi |
| 2010/0313139 | A1 * | 12/2010 | Watfa ................ G06F 17/30702 715/745 |
| 2013/0018955 | A1 | 1/2013 | Thaxton et al. |
| 2013/0204833 | A1 * | 8/2013 | Pang ................ G06F 17/30699 706/52 |
| 2013/0204940 | A1 | 8/2013 | Kinsel et al. |
| 2014/0280236 | A1 * | 9/2014 | Faller ................ G06F 17/3053 707/749 |
| 2015/0039293 | A1 | 2/2015 | Viswanathan et al. |
| 2015/0142888 | A1 | 5/2015 | Browning et al. |
| 2017/0140036 | A1 * | 5/2017 | Owens ................ G06N 99/005 |

OTHER PUBLICATIONS

"SaneBox for Business", [online] SaneBox, Inc. © 2015 [retrieved Nov. 17, 2015] retrieved from the Internet: <https://www.sanebox.com/business>, 3 pg.

"Facebook Launches Advanced AI Effort to Find Meaning in Your Posts," [online] SlashdotMedia © 2015, posted Sep. 21, 2013 [retrieved Nov. 17, 2015] retrieved from the Internet: <http://tech.slashdot.org/story/13/09/21/1831239/facebook-launches-advanced-ai-effort-to-find-meaning-in-your-posts>, 14 pg.

"Deep Learning," [online] Wikipedia, The Free Encyclopedia, Nov. 12, 2014 [retrieved Nov. 17, 2015] retrieved from the Internet: <http://en.wikipedia.org/wiki/Deep_learning>, 31 pg.

Reed, F., "Facebook Looks to Improve News Feed Content Quality," [online] Marketing Pilgrim © 2005-2015, Aug. 26, 2013 [retrieved Nov. 17, 2015] retrieved from the Internet: <http://www.marketingpilgrim.com/2013/08/facebook-looks-to-improve-news-feed-content-quality.html>, 5 pg.

"SPSS Text Analytics for Surveys," [online] IBM Corporation [retrieved Nov. 17, 2015], retrieved from the Internet: <http://www-01.ibm.com/software/analytics/spss/products/statistics/text-analytics-for-surveys/>, 2 pg.

SPSS Statistics, [online] IBM Corporation [retrieved Nov. 17, 2015], retrieved from the Internet: <http://www-01.ibm.com/software/analytics/spss/products/statistics/>, 2 pg.

"Natural Language Processing," [online] Wikipedia, The Free Encyclopedia, Nov. 4, 2015 [retrieved Nov. 17, 2015] retrieved from the Internet: <https://en.wikipedia.org/wiki/Natural_language_processing>, 9 pg.

"Why is Google.co.in showing and highlighting antonyms of a keyword in search results?," [onlione] Stack Exchange Inc. © 2015 [retrieved Nov. 17, 2015] retrieved from the Internet: <http://webmasters.stackexchange.com/questions/56861/why-is-google-co-in-showing-and-highlighting-antonyms-of-a-keyword-in-search-res>, 3 pg.

* cited by examiner

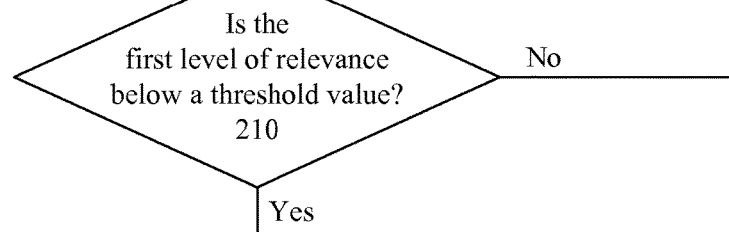

200

Determine a first level of relevance, to at least one interest of a user, of content within a topic message within a message stream
205

Is the first level of relevance below a threshold value?
210

No

Yes

Process each of a plurality of other messages within the message stream using natural language processing performed by a processor and determine, for each of the other messages, a respective second level of relevance of the other message to the at least one interest of the user
215

For each of the other messages for which the respective second level of relevance is equal to or above the threshold value, present an alert to bring an attention of the user to the other message
220

End
225

FIG. 2

IDENTIFYING RELEVANT CONTENT CONTAINED IN MESSAGE STREAMS THAT APPEAR TO BE IRRELEVANT

BACKGROUND

The present invention relates to electronic communications, and more specifically, to managing communicated information.

Electronic mail (e-mail) clients and online social networks are used universally to connect people and information in logical and organized ways, enabling information to be shared among the users. The most common mechanisms of sharing and processing information are email client inboxes and social network walls, activity streams, timelines and profiles. These mechanisms enable people to rapidly share information with, and gather information from, other people.

SUMMARY

A method includes determining a first level of relevance, to at least one interest of a user, of content within a topic message within a message stream. The method also includes, responsive to determining that the first level of relevance, to the at least one interest of the user, of the content within the topic message is below a threshold value, processing each of a plurality of other messages within the message stream using natural language processing performed by a processor and determining, for each of the other messages, a respective second level of relevance of the other message to the at least one interest of the user and, for each of the other messages for which the respective second level of relevance is equal to or above the threshold value, presenting an alert to bring an attention of the user to the other message.

A system includes a processor programmed to initiate executable operations. The executable operations include determining a first level of relevance, to at least one interest of a user, of content within a topic message within a message stream. The executable operations also include, responsive to determining that the first level of relevance, to the at least one interest of the user, of the content within the topic message is below a threshold value, processing each of a plurality of other messages within the message stream using natural language processing performed by the processor and determining, for each of the other messages, a respective second level of relevance of the other message to the at least one interest of the user and, for each of the other messages for which the respective second level of relevance is equal to or above the threshold value, presenting an alert to bring an attention of the user to the other message.

A computer program includes a computer readable storage medium having program code stored thereon. The program code is executable by a processor to perform a method. The method includes determining, by the processor, a first level of relevance, to at least one interest of a user, of content within a topic message within a message stream. The method also includes, responsive to determining that the first level of relevance, to the at least one interest of the user, of the content within the topic message is below a threshold value, processing each of a plurality of other messages within the message stream using natural language processing performed by the processor and determining, by the processor, for each of the other messages, a respective second level of relevance of the other message to the at least one interest of the user and, for each of the other messages for which the respective second level of relevance is equal to or above the threshold value, presenting, by the processor, an alert to bring an attention of the user to the other message.

BRIEF DESCRIPTION OF THE DRAWINGS

FIG. 2 is a flow chart illustrating an example of a method of identifying relevant content contained in message streams that appear to be irrelevant.

DETAILED DESCRIPTION

Figure 1:
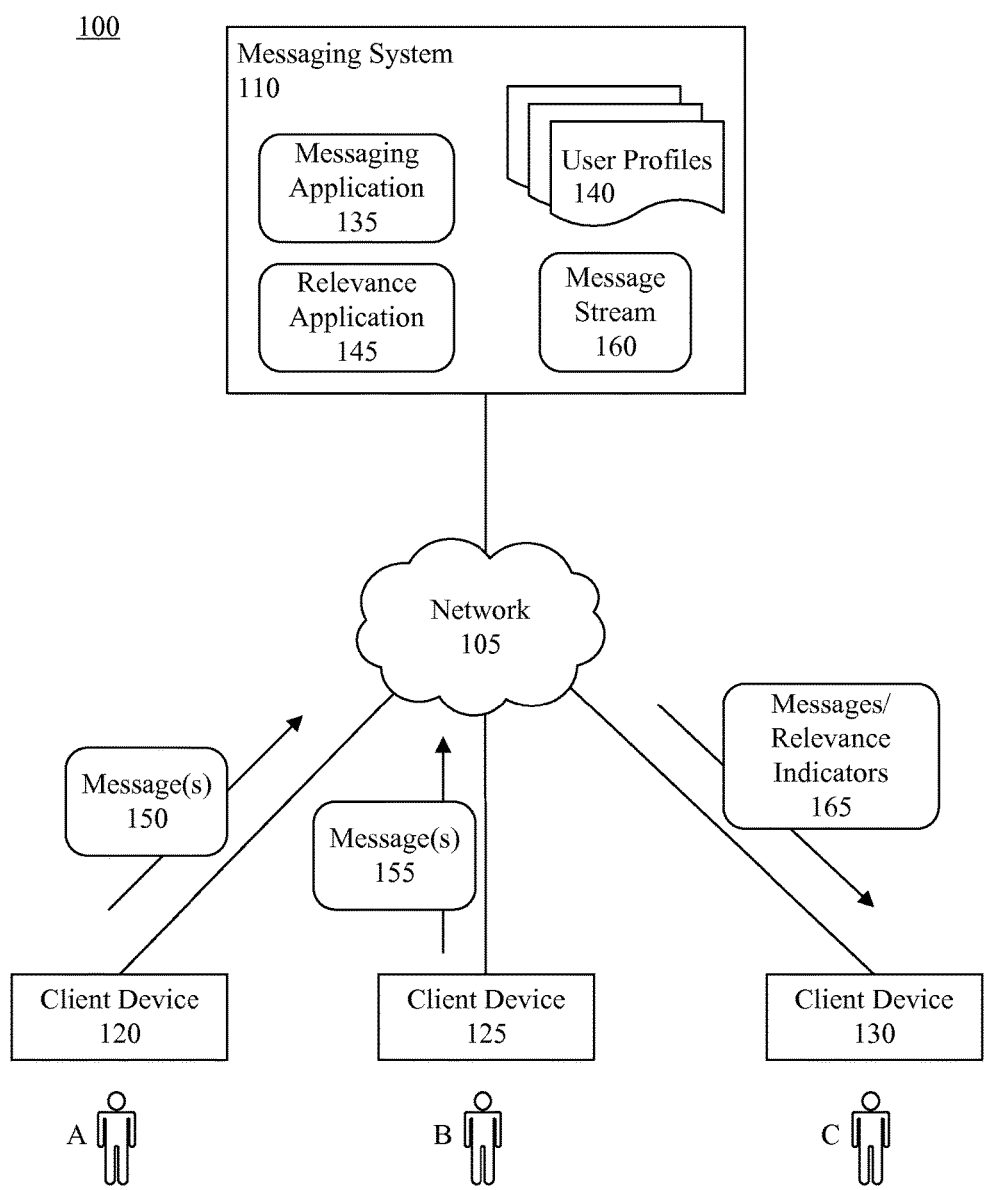
FIG. 1 is a block diagram illustrating an example of a network data processing system.

The present invention relates to electronic communications, and more specifically, to managing communicated information. In accordance with the inventive arrangements disclosed herein, message streams that initially appear to be irrelevant to a user's interests can be identified. For example, a topic message in a message stream posted by a co-worker of the user may pertain to cycling, but the user may not have an interest in cycling. Nonetheless, other messages contained in the message stream may include content which is of interest to the user. For example, one or more messages within the message stream may pertain to a project the user is working on at work. When the user briefly scans multiple topic messages in various message streams to determine which message streams the user should read, the user may overlook the message stream having the topic message pertaining to cycling, even though there may be other messages contained in that message stream that the user should read.

Responsive to identifying message streams that initially appear to be irrelevant to the user, a processing system can perform natural language processing and semantic analysis on the messages within the message streams to determine wither any of the messages actually contain content that is of interest to the user. If any messages are identified as containing content that is of interest to the user, the processing system can present an alert to bring the attention of the user to such messages. For example, the processing system can visually distinguish such messages and/or visually distinguish the content that is of interest to the user within the messages. Accordingly, the present arrangements bring such messages to the attention of the user, thus mitigating risk of the user overlooking the messages based on a quick scan of message topics.

Several definitions that apply throughout this document now will be presented.

As defined herein, the term "message" means an e-mail communicated by one user to one or more other users, a text message communicated by one user to one or more other users, or information posted by a user in a web-based forum. A message may include text, one or more images and/or one or multimedia content.

As defined herein, the term "topic message" means an initial message (e.g., the first message) in a message stream.

As defined herein, the term "e-mail" means an electronic mail delivered via a communication network to at least one user. An e-mail may be sent by one user to one or more other users. In this regard, an e-mail typically identifies at least recipient using a user name (e.g., e-mail address) corresponding to the recipient, or a group name corresponding to a group of recipients, in at least field within the e-mail, for example within a "To" field, "Cc" field and/or "Bcc" field in a header of the e-mail. A recipient may view an e-mail via an e-mail client, which may execute on a client device or a server to which a client device is communicatively linked.

As defined herein, the term "text message" means a message comprising text delivered via a communication network to at least one user identified as a recipient. A text message may be sent by one user to one or more other users. In this regard, a text message typically identifies at least one recipient using a user name, telephone number or the like. A text message also may comprise audio, image and/or multimedia content. A text message can be delivered, for example, using the short message service (SMS), the text messaging service (TMS) and/or the multimedia messaging service (MMS). A text message also may be referred to as an "instant message." As defined herein, a text message itself is not a result generated by an Internet search engine per se, although a text message may contain one or more uniform resource identifiers, such as hyperlinks, which can be generated by an Internet search engine and copied, for example by a user (e.g., sender), into the text message. In this regard, if a user uses a web browser to access an Internet search engine to perform an Internet search, and the user receives results from the Internet search engine in the web browser, such results are not a text message as the term text message is defined herein.

As defined herein, the term "web-based forum" means is an online discussion site where people can post messages that are viewable by other people. For example, people can hold conversations in a web-based forum by posting messages. Some messages posted in a web-based forum may be responses to other posted messages, or ask questions related to other posted messages. A web-based forum can be, for example, a social networking site, which is an online service platform on which social networks or social relations are built among people who, for example, share interests, activities, backgrounds or real-life connections.

As defined herein, the term "post" means to enter a message in a thread of a web-based forum. A new thread can be created in which to enter the message, or the message can be entered into an existing thread.

As defined herein, the term "message stream" means series of related messages. Examples of a message stream include a message thread within a social networking system, a series of exchanged e-mails and a series of exchanged text messages. A message stream can include a topic message and one or more messages replying to the topic message or responding to other messages within the message stream.

As defined herein, the term "natural language analysis" means a process that derives a computer understandable meaning of a human language.

As defined herein, the term "human language" is a language spoken or written by human beings that is not a computer programing language. A "human language" may be referred to as a "natural language."

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a digital personal assistant, a smart watch, smart glasses, a gaming device, a set-top box and the like. Network infrastructure, such as routers, firewalls, switches, and the like, are not client devices as the term "client device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

FIG. 1 is a block diagram illustrating an example of a network data processing system 100 in which the inventive arrangements may be implemented. The network data processing system 100 contains a network 105. The network 105 is the medium used to provide communications links between various devices and data processing systems connected together within network data processing system 100. The network 105 may include connections, such as wire, wireless communication links, or fiber optic cables. The network 105 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

The network data processing system 100 also can include a messaging system 110 and client devices 120, 125, 130, each of which may be coupled to the network 105. The messaging system 110 may be implemented as one or more data processing systems (e.g., servers), each including at least one processor and memory, executing suitable operational software to support the sharing and/or exchange of messages, for example a messaging application 135. In illustration, the messaging system 110 can execute a messaging application 135, which can be an e-mail server, an instant messaging server or a web-based forum.

In one arrangement, the messaging system 110 also can store user profiles 140 for users A, B, C of the client devices 120, 125, 130, respectively, and execute a relevance application 145. In another arrangement, one or more of the client devices 120-130 can store a user profile 140 for a respective user A-C and execute the relevance application 145 locally on the client device(s) 120-130. In an arrangement in which the messaging system 110 stores the user profiles 140, the user profiles can be stored to memory elements within the messaging system 110 or to a computer readable storage medium coupled to the messaging system 110 directly or via the network 105.

Each user profile 140 can include user profile information for a respective user A-C. For example, each user profile 140 can indicate interests of a respective user. The interests can relate to the user's work activity, projects assigned to the user, co-workers, subordinates and supervisors of the user, etc. The interests also can relate to interests of the user outside of work, for example hobbies, sports, personal projects, social groups in which the user may participate, and the like.

Each user profile 140 for a respective user A-C can be created by the respective user A-C, or the messaging system 110 can automatically create the user profile 140 based on processing information obtained by the user by monitoring the user's activity pertaining to messaging, searching the Internet, or the like. Even if the user profiles 140 are generated by the users A-C, the messaging system 110 can automatically update the user profiles 140 to include user interests identified by the user's activity pertaining to messaging, searching the Internet, or the like. For example, if user C searches the Internet for information related to database development, and the user profile 140 of user C does not already indicate that user C is interested in database development, the messaging system 110 can automatically update the user profile 140 of user C to indicate that database development is an interest of user C. In another example, if the user profile 140 of user C indicates that user C is a database developer, but the user profile 140 of user C does not already indicate database development is an interest of user C, the messaging system 110 can automatically update the user profile 140 of user C to indicate that database development is an interest of user C.

FIG. 1 is provided for purposes of illustration and is not intended to limit the inventive arrangements described herein. It should be appreciated that network data processing system 100 may include fewer elements than shown or more elements such as additional servers, clients, and other devices.

In operation, the user A may, using the client device 120, communicate one or more messages 150 to the messaging system 110. At least one of the messages 150, for example a first of the messages 150, can be a topic message. The user B may, using the client device 125, communicate one or more messages 155 to the messaging system 110 replying to one or more of the messages 150. The user A may communicate one or more additional messages 150 replying to one or more of the messages 155, and so on. Similarly, other users using other client devices (not shown) can communicate messages to the message system replying to one or more of the messages 150, 155. The topic message and each of the reply messages can form a message stream 160 indicating parent/child relationships between the messages 150, 155, as is well known in the art. In this regard, the message stream 160 can contain the topic message and each of the reply messages.

In one arrangement, the messaging system 110 can store each message 150, 155 to memory elements within the messaging system 110, or to a computer readable storage medium coupled to the messaging system 110 directly or via the network 105, with metadata associating the messages 150, 155 with the message stream 160. Users A-C can access the message stream 160, and thus the messages 150, 155, using respective client devices 120-130, by logging into the messaging system 110, as is well known in the art.

In another arrangement, for example in which the messages 150, 155 are e-mails or text messages, the messaging system 110 can communicate the messages 150, 155 to the client devices 120-130 of users A-C indicated as recipients of the messages 150, 155, and the client devices 120-130 can associate the messages with the message stream 160. For example, messages 150, 155 sent and received by a client device 120-130 that are all part of the same message stream 160 can be associated with each other in the message stream 160, as is well known in the art.

Regardless of whether the messages 150, 155 contained in the message stream 160 are stored by the messaging system 110 or the client devices 120-130, a relevance application 145 can be executed to determine relevance of the messages 150, 155 to one or more of the users A-C. If the message stream 160 is stored by the messaging system 110, the relevance application 145 can be executed by the messaging system 110. If the message stream 160 is stored locally on the client devices 120-130, each client device 120-130 can execute a respective copy of the relevance application 145. In the following description, an arrangement is described in which the messaging system 110 executes the relevance application 145 to determine a relevance of the messages 150, 155 to one or more users A-C. Nonetheless, it will be understood to those skilled in the art that one or more of the client devices 120-130 can execute the relevance application 145 to determine a relevance of the messages 150, 155 to one or more users A-C, and thus the present arrangements are not limited in this regard.

Responsive to each message 150, 155 being received by the messaging system 110 (or a client device 120-130), or responsive to a user A-C accessing the message stream 160, the relevance application 145 can selectively determine a relevance of the messages 150, 155 to the user. In illustration, the relevance application 145 can determine the relevance of each message 150, 155 by implementing natural language processing (NLP) and semantic analysis on content contained in each message 150, 155, and determining a relevance of the content to an interest of a user A-C. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input.

In the case that the content of one or more of the messages 150, 155 include one or more images and/or multimedia content (e.g., video), the relevance application 145 also can determine the relevance to one or more interests of a user A-C of each message 150, 155 by processing the images and/or multimedia content. In this regard, the relevance application 145 can determine a level of relevance of the images and/or multimedia content to one or more interests of the user A-C. For example, the relevance application 145 can identify text in images and perform NLP and semantic analysis on such text. The relevance application 145 also can identify objects in images and perform image processing known in the art to identify the objects contained in the images. With multimedia content, the relevance application 145 can perform speech recognition on audio contained in the multimedia content to convert the audio to text, and perform NLP and semantic analysis on such text. Also, the relevance application 145 can identify objects in images contained in the multimedia content and apply image processing known in the art to identify the objects contained in such images.

The messaging system 110 (or a client device 120-130) can receive a message 150 from the client device 120, which is topic message generated by the user A starting a new topic, and identify that message as starting a new message stream 160. The relevance application 145 can process that message 150 to determine a level of relevance of content within the message 150 to one or more other users, for example user C. Based on the aforementioned processing applied to the content (e.g., text, image(s) and/or multimedia content), and the user profile 140 of the user C, the relevance application 145 can assign value to the message 150 and/or the content of the message 150 indicating a level of relevance of the message 150 to the user C. In illustration, the relevance application 145 can determine whether the content relates to interest of user C indicated in the user profile 140 of user C and, if so, how closely the content relates to the interest. For example, if the user profile 140 of user C indicates that user C is participating in a project at work relating to database development, and the message 150 includes content pertaining to database development, the value can be a high value. If, on the other hand, the message 150 does not include any content related to interests of user C indicated in the user profile 140 of user C, but instead includes content unrelated to such interests, the value can be a low value.

Responsive to determining that the level of relevance, to at least one interest of user C, of the content within the topic message 150 is equal to or above a threshold value, the relevance application 145 need not take any further action pertaining to other messages 150, 155 added to the message stream 160. Because the topic of the message stream 160 has been determined to be relevant to the user's interests, it can be assumed that the user will review the topic message 150 and other messages 150, 155 added to the message stream. Further, the relevance application 145 can identify messages that are unwanted messages, such as irrelevant or inappropriate messages sent via the Internet to a large number of recipients (e.g., e-mails commonly referred to as "spam"). The relevance application 145 need not take any further action pertaining to such messages or responses to such messages.

On the other hand, responsive to determining that the level of relevance, to at least one interest of user C, of the content within the topic message 150 is below the threshold value, the relevance application 145 can process each of the other messages 150, 155 added to the message stream 160 to determine whether such other messages 150, 155 are relevant to the interests of user C. In this regard, the relevance application 145 can assign a value to each of the other messages 150, 155 and/or the content of the other messages 150, 155 indicating a level of relevance of the other messages 150, 155 to the user C.

By way of example, the topic message 150 may be posted by user A and pertain to cycling, and user A may be a co-worker of user C. The user profile of user C may not indicate that user C has an interest in cycling. Another message 155 posted by user B, replying to the topic message 150 posted by user A, may ask user A a question regarding database development. User A may respond to that message 155 with another message 150 pertaining to database development. Because the user profile 140 of user C indicates that user C has an interest in database development, the messages 150, 155 pertaining to database development can be assigned a value for level of relevance that is equal to or higher than the threshold value.

For each of the other messages 150, 155 for which the respective second level of relevance is equal to or above the threshold value, the relevance application 145 can present an alert to bring an attention of user C to the other message 150, 155. For example, in an arrangement in which user C logs into the messaging system 110 to view messages, the relevance application 145 can interface with the messaging application 135 to provide one or more indicators for those other messages 150, 155 to bring user C's attention to those other messages 150, 155, for example by highlighting the other messages 150, 155 or content within the other messages 150, 155 that is of interest to the user, providing a different background color for the such other messages 150, 155 and/or the content, expand such other messages 150, 155 and/or the content, providing indicators prompting user C to review such other messages 150, 155 and/or the content, or the like. The messages with relevance indicators 165 can be communicated from the messaging system 110 to the client device 130 for presentation to the user C. In an arrangement in which the relevance application 145 is executed by the client device 130, the relevance application 145 can interface with an e-mail client or text messaging client executed by the client device 130 to provide one or more indicators for the other messages 150, 155 determined to be relevant to the interest of user C in order to bring user C's attention to those other messages 150, 155, for example as previously described.

FIG. 2 is a flow chart illustrating an example of a method 200 of identifying relevant content contained in message streams that appear to be irrelevant. At step 205, the relevance application, being executed by a processor, can determine a first level of relevance, to at least one interest of a user, of content within a topic message within a message stream. At decision box 210, the relevance application can determine whether the first level of relevance is below a threshold value. If not, at step 225 the process can end. The process can be repeated responsive to a next topic message being received.

Referring again to decision box 210, if the relevance application determines that the first level of relevance is below the threshold value, the process can proceed to step 215. At step 215, the relevance application can process each of a plurality of other messages within the message stream using natural language processing, and determine, for each of the other messages, a respective second level of relevance of the other message to the at least one interest of the user. At step 220, the relevance application can, for each of the other messages for which the respective second level of relevance is equal to or above the threshold value, present an alert to bring an attention of the user to the other message. The process can end at step 225. The process can be repeated responsive to a next topic message being received.

Figure 3:
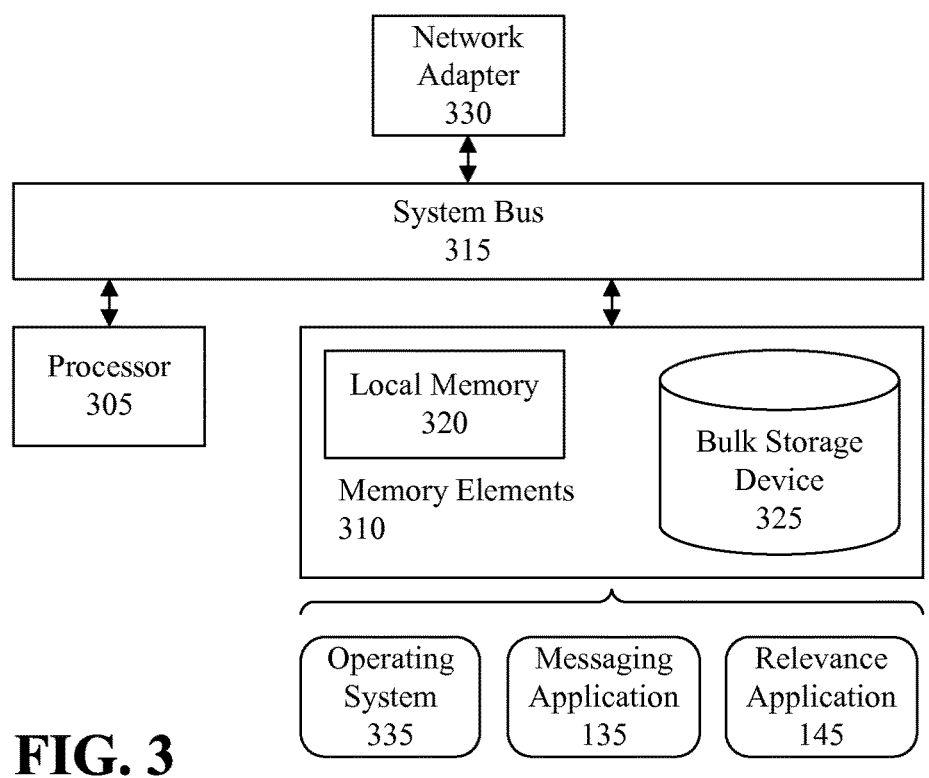
FIG. 3 is a block diagram illustrating example architecture for a messaging system.

FIG. 3 is a block diagram illustrating example architecture for a messaging system 110. The messaging system 110 can include at least one processor 305 (e.g., a central processing unit) coupled to memory elements 310 through a system bus 315 or other suitable circuitry. As such, the messaging system 110 can store program code within the memory elements 310. The processor 305 can execute the program code accessed from the memory elements 310 via the system bus 315. It should be appreciated that the messaging system 110 can be implemented in the form of any system including a processor and memory that is capable of performing the functions and/or operations described within this specification. For example, the messaging system 110 can be implemented as one or more hardware servers.

The memory elements 310 can include one or more physical memory devices such as, for example, local memory 320 and one or more bulk storage devices 325.

Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The messaging system 110 also can include one or more cache memories (not shown) that provide temporary storage of at least some program code in order to reduce the number of times program code must be retrieved from the bulk storage device 325 during execution.

One or more network adapters 330 can be coupled to messaging system 110 to enable the messaging system 110 to become coupled to other systems, computer systems, remote printers, and/or remote storage devices through intervening private or public networks. Modems, cable modems, transceivers, and Ethernet cards are examples of different types of network adapters 330 that can be used with the messaging system 110.

As pictured in FIG. 3, the memory elements 310 can store an operating system 335, the messaging application 135 and the relevance application 145. Being implemented in the form of executable program code, the operating system 335 and the operating system 335, messaging application 135 and relevance application 145 can be executed by the processor 305. For example, the processor can execute the messaging application 135 and relevance application 145 within a computing environment provided by the operating system 335 in order to perform the processes described herein that are performed by the messaging system 110. As such, the operating system 335, messaging application 135 and relevance application 145 can be considered part of the messaging system 110. Moreover, the operating system 335 and relevance application 145 are functional data structures that impart functionality when employed as part of the messaging system 110. Further, the previously described user profiles, messages and message stream are functional data structures that impart functionality when processed by the messaging system 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining a first level of relevance, to at least one interest of a user, of content within a topic message within a message stream, wherein the at least one interest of the user is determined, at least in part, based on activity of the user pertaining to searching the Internet, wherein the topic message is an initial message in the message stream comprising the topic message and a plurality of reply messages, the message stream indicating parent/child relationships among the topic message and the plurality of reply messages;

responsive to determining that the first level of relevance, to the at least one interest of the user, of the content within the topic message is below a threshold value:

processing each of the plurality of reply messages within the message stream using natural language processing performed by a processor and determining, for each of the reply messages, a respective second level of relevance of the reply message to the at least one interest of the user; and for each of the reply messages for which the respective second level of relevance is equal to or above the threshold value, presenting an alert to bring an attention of the user to the reply message.

2. The method of claim 1, wherein presenting the alert to bring the attention of the user to the reply message comprises:
indicating at least one portion of the reply message that contains content that is of interest to the user.

3. The method of claim 1, wherein processing each of a plurality of reply messages within the message stream further comprises performing semantic analysis on the reply messages within the message stream.

4. The method of claim 1, wherein at least one of the reply messages comprises at least one image, the method further comprising:
performing image processing to identify at least one object contained in the image;
wherein determining, for the at least one of the reply messages, the respective second level of relevance to the at least one interest of the user comprises determining a level of relevance of the at least one object to the user.

5. The method of claim 1, wherein at least one of the reply messages comprises multimedia content, the method further comprising:
performing image processing to identify at least one object contained in the multimedia content;
wherein determining, for the at least one of the reply messages, the respective second level of relevance to the at least one interest of the user comprises determining a level of relevance of the at least one object to the user.

6. The method of claim 1, wherein at least one of the reply messages comprises multimedia content, the method further comprising:
performing speech recognition on audio contained in the multimedia content to convert the audio to text;
wherein processing each of at least one of the reply messages within the message stream using natural language processing performed by the processor comprises performing natural language processing on the text converted from the audio contained in the multimedia content.

7. A system, comprising:
a processor programmed to initiate executable operations comprising:
determining a first level of relevance, to at least one interest of a user, of content within a topic message within a message stream, wherein the at least one interest of the user is determined, at least in part, based on activity of the user pertaining to searching the Internet, wherein the topic message is an initial message in the message stream comprising the topic message and a plurality of reply messages, the message stream indicating parent/child relationships among the topic message and the plurality of reply messages;
responsive to determining that the first level of relevance, to the at least one interest of the user, of the content within the topic message is below a threshold value:
processing each of the plurality of reply messages within the message stream using natural language processing performed by the processor and determining, for each of the reply messages, a respective second level of relevance of the reply message to the at least one interest of the user; and
for each of the reply messages for which the respective second level of relevance is equal to or above the threshold value, presenting an alert to bring an attention of the user to the reply message.

8. The system of claim 7, wherein presenting the alert to bring the attention of the user to the reply message comprises:
indicating at least one portion of the reply message that contains content that is of interest to the user.

9. The system of claim 7, wherein processing each of a plurality of reply messages within the message stream further comprises performing semantic analysis on the reply messages within the message stream.

10. The system of claim 7, wherein at least one of the reply messages comprises at least one image, the executable operations further comprising:
performing image processing to identify at least one object contained in the image;
wherein determining, for the at least one of the reply messages, the respective second level of relevance to the at least one interest of the user comprises determining a level of relevance of the at least one object to the user.

11. The system of claim 7, wherein at least one of the reply messages comprises multimedia content, the executable operations further comprising:
performing image processing to identify at least one object contained in the multimedia content;
wherein determining, for the at least one of the reply messages, the respective second level of relevance to the at least one interest of the user comprises determining a level of relevance of the at least one object to the user.

12. The system of claim 7, wherein at least one of the reply messages comprises multimedia content, the executable operations further comprising:
performing speech recognition on audio contained in the multimedia content to convert the audio to text;
wherein processing each of at least one of the reply messages within the message stream using natural language processing performed by the processor comprises performing natural language processing on the text converted from the audio contained in the multimedia content.

13. A computer program product comprising a computer readable storage medium having program code stored thereon, the program code executable by a processor to perform a method comprising:
determining, by the processor, a first level of relevance, to at least one interest of a user, of content within a topic message within a message stream, wherein the at least one interest of the user is determined, at least in part, based on activity of the user pertaining to searching the Internet, wherein the topic message is an initial message in the message stream comprising the topic message and a plurality of reply messages, the message stream indicating parent/child relationships among the topic message and the plurality of reply messages;
responsive to determining that the first level of relevance, to the at least one interest of the user, of the content within the topic message is below a threshold value:
processing each of the plurality of reply messages within the message stream using natural language processing performed by the processor and determining, by the processor, for each of the reply messages, a respective second level of relevance of the reply message to the at least one interest of the user; and for each of the reply messages for which the respective second level of relevance is equal to or above the threshold value, presenting, by the processor, an alert to bring an attention of the user to the reply message.

14. The computer program product of claim 13, wherein presenting the alert to bring the attention of the user to the reply message comprises:

indicating at least one portion of the reply message that contains content that is of interest to the user.

15. The computer program product of claim 13, wherein processing each of a plurality of reply messages within the message stream further comprises performing semantic analysis on the reply messages within the message stream.

16. The computer program product of claim 13, wherein at least one of the reply messages comprises at least one image, the method further comprising:

performing image processing to identify at least one object contained in the image;

wherein determining, for the at least one of the reply messages, the respective second level of relevance to the at least one interest of the user comprises determining a level of relevance of the at least one object to the user.

17. The computer program product of claim 13, wherein at least one of the reply messages comprises multimedia content, the method further comprising:

performing image processing to identify at least one object contained in the multimedia content;

wherein determining, for the at least one of the reply messages, the respective second level of relevance to the at least one interest of the user comprises determining a level of relevance of the at least one object to the user.

18. The computer program product of claim 13, wherein at least one of the reply messages comprises multimedia content, the method further comprising:

performing speech recognition on audio contained in the multimedia content to convert the audio to text;

wherein processing each of at least one of the reply messages within the message stream using natural language processing performed by the processor comprises performing natural language processing on the text converted from the audio contained in the multimedia content.

* * * * *